April 6, 1954

T. A. ELLIOTT ET AL 2,674,374

CORRUGATED SLOT SCREEN

Filed June 18, 1951

INVENTORS.
THOMAS A. ELLIOTT
ROBERT L. ALLEN
BEN W. CARMICHAEL
BY

ATTORNEY

Patented Apr. 6, 1954

2,674,374

UNITED STATES PATENT OFFICE 2,674,374

CORRUGATED SLOT SCREEN

Thomas A. Elliott, Decatur, and Robert L. Allen and Ben W. Carmichael, Atlanta, Ga., assignors to Georgia Tech Research Institute, Atlanta, Ga., a corporation of Georgia Application June 18, 1951, Serial No. 232,157

4 Claims. (Cl. 209—136)

Our present invention relates to a corrugated slot screen, and more particularly to such a device for removing sticks from peanuts, seeds and other nuts.

In the handling of peanuts, it will be remembered that somewhere between the time the peanuts are first threshed from the vine and until they reach the final processor, all foreign matter such as rocks, dust, sticks and the like must be removed, since the presence of such foreign material affects the grade prior to sale. Presence of these foreign bodies also causes breakage in the shelling equipment and therefore not only slows down this operation but actually causes damage to the shelling machinery.

The most opportune time and place for removal of these foreign bodies is, of course, at the farm itself during the threshing operation. But, since the cost of currently available machines would prevent their use on a large number of farms, these particular producers must suffer losses in sales to the shelling plant due to poor grades of products.

It is an object, therefore, of the present invention, to provide a corrugated slot screen for cleaning peanuts which effectively removes sticks and other trash from the peanuts and which is so constructed as to fall within the purchase price range of the ordinary peanut producer.

Another object of the invention is the provision of a machine which, by continuous processing, may be used advantageously either by the producer himself or by the processing and shelling plant which handles the peanuts in considerable quantities.

Another object of the invention is to provide a machine consisting simply of a trough agitated by some mechanical means, the trough being provided with a corrugated false bottom arranged to permit the product to slide along by force of gravity and fall into prepared slots positioned crosswise the false bottom, each slot being subjected to a force of air for carrying sticks and other light matter to a depository end of the trough and be thus separated from the peanuts themselves.

Other objects and advantages of the invention will become apparent in the course of the following detailed description when viewed together with the accompanying drawing in which:

Fig. 1 is a perspective view of an embodiment of my invention in a corrugated slot screen for cleaning peanuts and the like.

Figure 1:
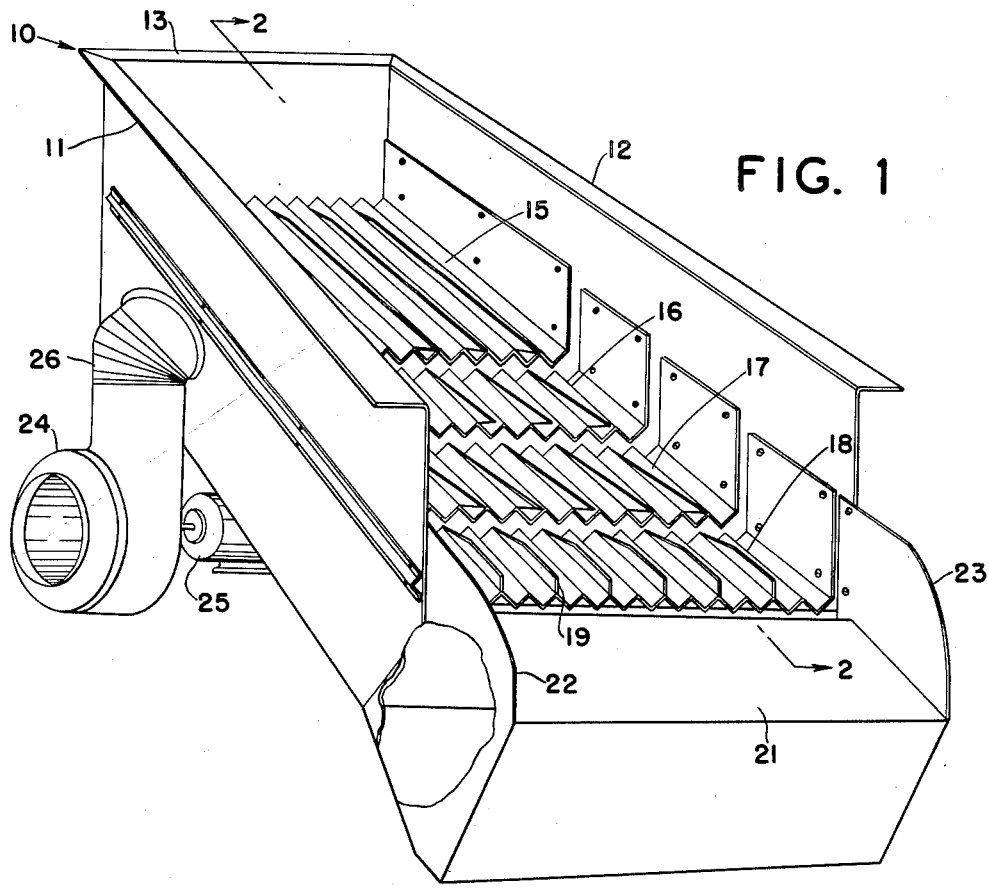

In the drawing, numeral 10 denotes generally a large trough having two, upstanding, parallel sides 11 and 12, one closed end 13 and an opposite open end, a bottom 14 and an open top.

Figure 2:
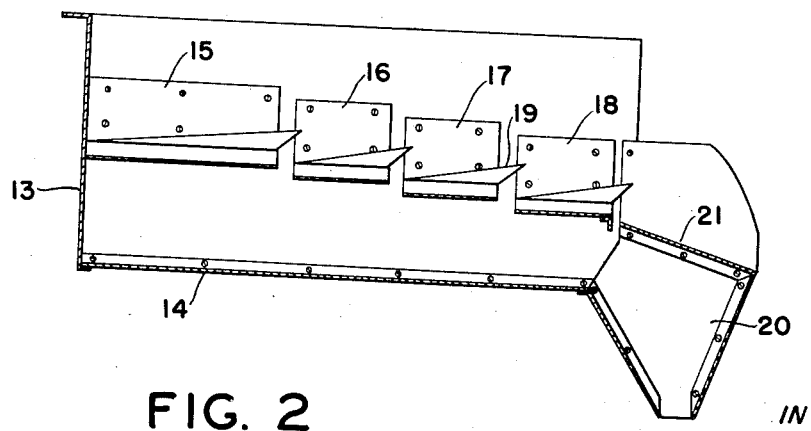
Fig. 2 is a cross-sectional view taken along line 2—2 of Fig. 1.

Spaced above the bottom 14 and suitably supported by the upstanding parallel side walls 11 and 12 are horizontally disposed corrugated floor sections 15, 16, 17 and 18, with the corrugations of each section running lengthwise the trough as shown. As illustrated in Fig. 2, a space is left between adjacent sections and the sections are staggered in height with the highest section 15 being at the rear end wall 13 of the trough and the lowest section 18 at the open-ended front thereof.

Along the length of every other upstanding corrugation in each of the floor sections is a baffle plate 19, each of these baffle plates occurring in alignment throughout the several sections. In Fig. 2, which presents a side view of the baffle plates 19, it can be seen that each of these plates is affixed to the crest of the corrugation on which it is mounted with the top edge thereof beveled rearwardly for its entire length, and the forward end or nose pointed outwardly and overlapping the space provided between the floor sections.

At the forward end of the trough 10 is a depository chute 20 the top 21 of which is placed on an incline as shown and serves as a final receiving platform for the sticks and other foreign matter separated from the peanuts themselves. The receiving platform 21 is provided with side members 22 and 23 serving to guide the finally removed trash into a receptacle (not shown) which might be placed adjacent the end of the platform 21.

As seen in Fig. 1 a conventional rotary type blower 24 is used in connection with the present invention, the blower being rotated by any sort of prime mover such as an electric motor 25 as illustrated in the drawings. The air discharge tube 26 from the blower 24 is directed through one of the side walls 11 of the trough 10 and at some point below the first floor section 15. Thus the entire area inside the bottom 14 and beneath the floor sections might be considered a plenum chamber which could be subjected to a positive air pressure from the blower 10.

In its operation, the device must necessarily be tilted upwardly at the back end 13 thereof so that the various floor sections, together with the bottom 14, may lie at a slightly inclined angle toward the open end of the trough.

While not shown in the drawings, the device further necessitates a mechanism for agitating the same. This mechanism might include any of the mechanisms of the prior art whether by simple leverage or whether by an eccentrically rotated ring. For the best results, however, it has been found that agitation should be lengthwise of the machine and at high speed strokes of from $\frac{1}{16}''$ to $\frac{3}{16}''$ magnitude.

With the device set up for operation including some means of agitation as above described, let it be assumed that a quantity of unprocessed peanuts is dumped into the trough 10 and upon the first corrugated floor section 15.

Due to the agitation of the entire trough, the peanuts will immediately align themselves in the lower recess of one of the corrugations of the floor section along with other light twigs and trash. Any sticks or twigs comparatively short in length will also align themselves in the recessed portion of one of the corrugations. Since each of the floor sections is placed on an incline, the peanuts, together with all of the trash, will begin its initial movement toward the first open space between the floor sections 15 and 16. It is well to note here that any twig or stick longer than the distance between any two corrugations and lying crosswise the floor is carried along the inclined back face of one or more of the baffle plates 19 and will sooner or later be cast off onto the next floor section or will fall lengthwise into one of the corrugations of the floor section.

When the first of the moving peanuts reach the end of the floor section 15, they will fall by force of gravity into the space provided between the first and second floor sections 15 and 16 and down onto the bottom 14. Since a positive air pressure from the blower 10 is maintained below the floor sections, it is readily seen that a stream of air is directed through this open space sufficient to prevent any light sticks and other trash from falling to the bottom 14. Any sticks of sufficient length to bridge the gap provided between floor sections will simply slide across the gap, assisted, of course, by the column of air.

The deliberate offset in height provided between the first and second floor sections 15 and 16 and between each succeeding floor section greatly assists in the general forward movement of both the peanuts and the trash, since the air pressure tends to catch everything as it falls and not only push it upwardly but forwardly in the direction of the depository end of the machine.

It is quite possible that some of the peanuts will not fall into the first slot between the floor sections but will be carried over the second floor section. If such is the case the same procedure will be followed by both the peanuts and the accompanying sticks and trash, not only upon this second floor section but also upon the third 17 and the fourth 18.

By experimentation it has been found that if the proper air pressure is maintained beneath the floor sections, few, if any, peanuts will ever reach the foremost floor section 18. Trash and accompanying sticks, however, will have been carried across each floor section and "floated" across each intervening slot so that when finally deposited upon the forward delivery platform 21, they are entirely separated from the peanuts with which they entered the trough. By placing some receptacle (not shown) adjacent the end of the platform 21, the trash may be trapped and disposed of accordingly.

The peanuts falling through the slots between the floor sections will accumulate on the bottom 14 where, due to the incline thereof and the agitation of the machine, they will be moved forwardly until finally dropped through the chute 20 and into a waiting container (not shown).

As shown and described, the invention is simple in its manufacture and operation and may be constructed in such a manner as to lie within the purchasing range of the ordinary peanut grower. Use of the present device directly at threshing time will permit the producer to offer for sale a quantity of peanuts of first quality, clean and ready for shelling or further processing. The increased price that such peanuts will bring will more than offset the cost of a cleaning machine made in accordance with the teachings of the present invention.

The machine is preferably made of sheet metal which has been treated to resist corrosion. The size and shape of the general trough is unimportant, as is the length of the various floor sections. Means for agitating the trough as well as means for rotating the blower are not considered part of the present invention. Changes and modifications in construction other than that shown in the present embodiment may be made without departing from our invention as defined by the following claims.

We claim:

1. In apparatus of the class described, a bottom and wall sections connected together to form a trough, a plurality of floor sections disposed in said trough at various heights above said bottom to form a plenum chamber, said floor sections being spaced apart lengthwise of said trough and provided with indentations running lengthwise of said trough, baffle plates mounted on said floor sections, said baffle plates having a portion extending outwardly and overhanging the space between adjacent floor sections, and means for supplying air under pressure to said plenum chamber.

2. In apparatus of the class described, a bottom and wall sections connected together to form a trough, a plurality of floor sections disposed in said trough above said bottom to form a plenum chamber, said floor sections being spaced apart lengthwise of said trough and provided with corrugations running lengthwise of said trough, baffle plates mounted on said floor sections, said baffle plates having a portion extending outwardly and over the space between adjacent floor sections, and means for supplying air under pressure to said plenum chamber.

3. In apparatus of the class described, a bottom and wall sections connected together to form a trough, a plurality of floor sections disposed in said trough above said bottom to form a plenum chamber, said floor sections being spaced apart lengthwise of said trough and provided with corrugations running lengthwise of said trough, baffle plates mounted on the crest of corrugations on said floor sections, said baffle plates having a portion extending outwardly and over the space between adjacent floor sections, and means for supplying air under pressure to said plenum chamber.

4. In apparatus of the class described, a bottom and wall sections connected together to form a trough, a plurality of floor sections disposed in said trough above said bottom to form a plenum chamber, said floor sections being spaced apart lengthwise of said trough and provided with corrugations running lengthwise of said trough, baffle plates mounted on the crest of alternate corrugations on said floor sections, said baffle plates having a nose portion extending outwardly and overlapping the space between adjacent floor sections, and means for supplying air under pressure to said plenum chamber.

References Cited in the file of this patent

UNITED STATES PATENTS

| Number | Name | Date |
|---|---|---|
| 495,809 | Houser | Apr. 18, 1893 |
| 780,158 | Closz | Jan. 17, 1905 |
| 909,757 | Closz | Jan. 12, 1909 |
| 925,623 | Closz | June 22, 1909 |
| 1,217,364 | Stuckel | Feb. 27, 1917 |
| 1,248,686 | Lindh | Dec. 4, 1917 |
| 2,253,296 | Holtzman | Aug. 19, 1941 |
| 2,303,249 | Ashton et al. | Nov. 24, 1942 |

FOREIGN PATENTS

| Number | Country | Date |
|---|---|---|
| 8,855/27 | Australia | Aug. 14, 1928 |
| 20,222/29 | Australia | Feb. 3, 1930 |
| 468,955 | Great Britain | July 13, 1937 |